(12) United States Patent
Feng et al.

(10) Patent No.: US 12,040,887 B2
(45) Date of Patent: Jul. 16, 2024

(54) OPTICAL TRANSMISSION DEVICE BASED ON DIRECT-SEQUENCE-SPREAD-SPECTRUM TIME-DIVISION-MULTIPLE-ACCESS AND METHOD THEREOF

(71) Applicant: Hunan University of Technology and Business, Changsha (CN)

(72) Inventors: Da Feng, Changsha (CN); Junwei Yu, Changsha (CN); Weijin Jiang, Changsha (CN)

(73) Assignee: Hunan University of Technology and Business, Changsha (CN)

( * ) Notice: Subject to any disclaimer, the term of this patent is extended or adjusted under 35 U.S.C. 154(b) by 0 days.

(21) Appl. No.: 17/799,912

(22) PCT Filed: Aug. 3, 2021

(86) PCT No.: PCT/CN2021/110309
§ 371 (c)(1),
(2) Date: Oct. 6, 2022

(87) PCT Pub. No.: WO2022/205721
PCT Pub. Date: Oct. 6, 2022

(65) Prior Publication Data
US 2024/0187119 A1    Jun. 6, 2024

(30) Foreign Application Priority Data
Apr. 2, 2021   (CN) .......................... 202110360706.9

(51) Int. Cl.
*H04J 3/16*     (2006.01)
*H04B 1/7073*   (2011.01)
*H04B 10/516*   (2013.01)

(52) U.S. Cl.
CPC .......... *H04J 3/1652* (2013.01); *H04B 1/7073* (2013.01); *H04B 10/516* (2013.01)

(58) Field of Classification Search
None
See application file for complete search history.

(56) References Cited

U.S. PATENT DOCUMENTS

| | | | |
|---|---|---|---|
| 7,349,381 B1 * | 3/2008 | Clark ................... | H04B 1/7156 370/350 |
| 2006/0147219 A1 * | 7/2006 | Yoshino ............... | H04B 10/548 398/183 |

(Continued)

FOREIGN PATENT DOCUMENTS

CN         112054977 A  * 12/2020   ....... H04L 25/03828

*Primary Examiner* — David W Lambert
(74) *Attorney, Agent, or Firm* — Zhu Lehnhoff LLP

(57) ABSTRACT

The invention discloses an optical transmission device based on direct-sequence-spread-spectrum time-division-multiple-access, which includes a signal transmitting module and a signal receiving module. The transmitting module is connected with the receiving module by optical fibers. The transmitting module is used for receiving an external data sequence signal, encoding the external data sequence signal into a direct-sequence-spread-spectrum time-division-multiple-access electric signal and modulating the resulting electric signal into corresponding spread-spectrum optical signal for transmission by optical fibre. The receiving module is used for receiving the direct-sequence-spread-spectrum time-division-multiple-access optical signal, and sequentially performing photoelectric conversion, analog despreading, analog-digital conversion and clock recovery to obtain the external data sequence signal. The invention realizes direct-sequence-spread-spectrum modulation supporting direct detection; at a receiving end, the despreading in analog domain removes impairments and improves sensitivity. The interleaved configuration of the up-link and (Continued)

down-link chip sequences and dynamic ranging through the time-division-multiple-access protocol realize the interleaved transmission of bytes.

20 Claims, 6 Drawing Sheets

(56) References Cited

U.S. PATENT DOCUMENTS

| | | | |
|---|---|---|---|
| 2007/0211786 A1* | 9/2007 | Shattil | H04J 13/00 375/147 |
| 2017/0180055 A1* | 6/2017 | Yu | H04J 14/06 |
| 2020/0204263 A1* | 6/2020 | Zhou | H04B 10/5563 |

* cited by examiner

OPTICAL TRANSMISSION DEVICE BASED ON DIRECT-SEQUENCE-SPREAD-SPECTRUM TIME-DIVISION-MULTIPLE-ACCESS AND METHOD THEREOF

FIELD OF THE INVENTION

The invention belongs to the field of optical communications, in particular, to an optical transmission device based on direct-sequence-spread-spectrum time-division-multiple-access and a method thereof.

DESCRIPTION OF THE PRIOR ART

In current years, optical communications have become the preferred research object of data access networks, which can meet the increasing requirements in the bandwidth of data services. However, with the introduction of the Tactile Internet, in addition to bandwidth, ultra-low latency, high reliability, high availability, and high security have been required for quality of service. Under the requirements of ultra-low latency combined with high data rate, only the new access network architecture can meet the requirement of communication delay of 100 us in up-link and down-link data transmission. As an IoT access technology, it must be as simple as possible, matching the control function intended for the equipment to be accessed, and be able to integrate with traditional data access technologies.

Through spread spectrum technology, multiple access without scheduling latency can be realized. In many fields, there are applications combining the spread spectrum and the scheduling, including LoRa, NB-IOT, MC-CDMA, and CDMA-PON. Commercial IoT access uses the first three, while the last technology has research deployments. LoRa can use Chirp spread spectrum combined with scheduling to achieve low-power long-distance data access. NB-IOT can use single-carrier multi-slot or multi-carrier single-slot OFDM to realize high-performance data transmission. MC-CDMA can use OFDM combined with spread spectrum to improve performance. CDMA-PON can use multi-wavelength coding to solve the collision of optical access. An optimization of LoRa is introduced according to "RT-LoRa: A Medium Access Strategy to Support Real-Time Flows Over LoRa-Based Networks for Industrial IoT Applications", an article by Luca Leonardi in Internet of Things Journal in 2019. According to the article, CLASS-A/B/C business mode of LoRa can meet the trade-off between real-time performance and power consumption through scheduling, which is extremely important for power-constrained equipment. An optimization of NB-IOT is also introduced according to "Enhancing the Performance of 802.15.4-Based Wireless Sensor Networks With NB-IOT", an article by Huikang Li in Internet of Things Journal in 2020. According to the article, the use of NB-IOT must require the installation of an OFDM module with full rate, which can ensure dynamic response and high performance but cannot guarantee low complexity. An optimization of MC-CDMA is also introduced according to "MC-CDMA Enhanced LR-PON Using Widely Wavelength Lockable FPLD with Low Facet Reflectance", an article by You-Wei Chen in Journal of Optical Communications and Networking in 2017. According to the article, the despreading needs to calculate the IFFT first, which increases the complexity and must be performed in combination with scheduling to determine the start of the OFDM frame. An optimization of CDMA-PON is also introduced according to "Study of Multicode-Keying Incoherent Optical CDMA without The Conventional Symbol-Synchronous Assumption", an article by Jing-Shiuan Lin in Journal of Lightwave Technology in 2016. According to the article, multi-wavelength coding must be used, which increases the complexity of the device, and synchronous scheduling must be combined to reduce collisions.

In summary, how to reduce the complexity of the access system while maintaining the real-time performance of the transmission system and reducing power consumption is a problem that needs to be solved at present.

SUMMARY OF THE INVENTION

A technical objective of the invention is to provide an optical transmission device based on direct-sequence-spread-spectrum time-division-multiple-access and a method thereof, so as to solve the technical problem of how to reduce the complexity of the access system and improve the practicability and efficiency of the transmission system.

In order to solve the problem, the invention uses the following technical solutions.

An optical transmission device based on direct-sequence-spread-spectrum time-division-multiple-access includes a signal transmitting module and a signal receiving module;
  wherein the signal transmitting module is connected with the signal receiving module by optical fibers;
  the signal transmitting module is used for receiving an external data sequence signal, encoding the external data sequence signal into a direct-sequence-spread-spectrum time-division-multiple-access electric signal, and modulating the direct-sequence-spread-spectrum time-division-multiple-access electric signal into a direct-sequence-spread-spectrum time-division-multiple-access optical signal;
  the signal receiving module is used for receiving the direct-sequence-spread-spectrum time-division-multiple-access optical signal and sequentially performing photoelectric conversion, analog despreading, analog-digital conversion, and clock recovery to obtain the external data sequence signal;
  the signal transmitting module includes a signal modulation sub-module, and the signal modulation sub-module is a raised cosine encoding modulation sub-module or a modified duobinary encoding modulation sub-module, wherein the raised cosine encoding modulation sub-module is used for receiving the external data sequence signal, and sequentially performing signal spectrum spreading and raised cosine encoding to obtain a raised cosine electric signal; the modified duobinary encoding modulation sub-module is used for receiving the external data sequence signal, and sequentially performing signal spectrum spreading, positive and negative separation and modified duobinary encoding to obtain a modified duobinary differential electric signal.

Further, preferably, the signal transmitting module further includes an electro-optical conversion sub-module, a first optical filter, and an optical amplifier;
  the electro-optical conversion sub-module is used for receiving and modulating the direct-sequence-spread-spectrum time-division-multiple-access electric signal into the direct-sequence-spread-spectrum time-division-multiple-access optical signal;
  the first optical filter is used for filtering the direct-sequence-spread-spectrum time-division-multiple-access optical signal;

the optical amplifier is used for power amplification of the direct-sequence-spread-spectrum time-division-multiple-access optical signal after the filtering.

The raised cosine encoding modulation sub-module includes a spread spectrum encoding unit, a spread spectrum sequence unit and a raised cosine encoding unit;

the spread spectrum encoding unit is used for receiving the external data sequence signal and an orthogonal pseudo-random sequence signal from the spread spectrum sequence unit to realize spread spectrum encoding of the external data sequence signal to obtain a spread spectrum signal;

the raised cosine encoding unit is used for receiving the spread spectrum signal to perform raised cosine encoding to obtain the raised cosine electric signal.

The modified duobinary encoding modulation sub-module includes the spread spectrum encoding unit, the spread spectrum sequence unit, a positive and negative separation unit, a first modified duobinary encoding unit and a second modified duobinary encoding unit;

the spread spectrum encoding unit is used for receiving the external data sequence signal and an orthogonal pseudo-random sequence signal from the spread spectrum sequence unit to realize spread spectrum encoding of the external data sequence signal to obtain a spread spectrum signal;

the positive and negative separation unit is used for receiving the spread spectrum signal and separating to obtain direct-sequence-spread-spectrum time-division-multiple-access differential signals;

the first modified duobinary encoding unit and the second modified duobinary encoding unit are used for receiving and performing modified duobinary encoding on one of the direct-sequence-spread-spectrum time-division-multiple-access differential signals respectively to obtain the modified duobinary differential electric signals.

The electro-optical conversion sub-module used by the raised cosine biased signal includes an electric amplifier and a $V_{\pi/2}$ biased Mach-Zehnder modulator;

the electric amplifier is used for receiving the raised cosine electric signal and performing electric signal amplification;

the $V_{\pi/2}$ biased Mach-Zehnder modulator is used for receiving the raised cosine electric signal after the electric amplification and modulating to obtain a raised cosine biased optical signal.

The electro-optical conversion sub-module used by the modified duobinary differential signal includes a first electric amplifier, a second electric amplifier, a first $V_\pi$ biased Mach-Zehnder modulator, and a second $V_\pi$ biased Mach-Zehnder modulator;

the first electric amplifier and the second electric amplifier are used for receiving one of the modified duobinary differential electric signals and performing electric amplification, respectively;

the first $V_\pi$ biased Mach-Zehnder modulator and the second $V_\pi$ biased Mach-Zehnder modulator are used for receiving and converting the modified duobinary differential electric signals output by the first electric amplifier and the second electric amplifier after the electric amplification into optical signals to obtain modified duobinary differential optical signals.

Specifically, the signal receiving module includes a second optical filter, a photo detector, an analog-to-digital converter, and a digital signal processing sub-module;

both the second optical filter and the first optical filter are used for an analog multiplexer/demultiplexer to realize final optical filtering;

the photo detector is used for receiving the direct-sequence-spread-spectrum time-division-multiple-access optical signal after the filtering and converting into electric signals, then also performing a subtraction operation required for the differential electrical signals;

the analog-to-digital converter is used for receiving the electric signals and converting the electric signals into digital signals;

the digital signal processing sub-module is used for performing clock recovery for the received digital signals to obtain the external data sequence signal, and uploading the external data sequence signal to a client.

Further, preferably, the device further includes a local sequence unit, wherein the local sequence unit is used for providing the orthogonal pseudo-random sequence signal, converting the electric signals output by the photo detector into despread electric signals, and delivering the despread electric signals to the analog-to-digital converter.

An optical transmission method based on direct-sequence-spread-spectrum time-division-multiple-access, applied to the optical transmission device based on direct-sequence-spread-spectrum time-division-multiple-access according to any one of the above items, includes steps of:

S1: multiplying an orthogonal pseudo-random sequence signal by the external data sequence signal to realize spread spectrum encoding to obtain a spread spectrum signal;

S2: either performing raised cosine encoding, based on the spread spectrum signal, to obtain a raised cosine electric signal; or, sequentially performing positive and negative separation and modified duobinary encoding, based on the spread spectrum signal, to obtain the modified duobinary differential electric signal;

S3: either sequentially performing electro-optical conversion and optical bias, based on the raised cosine electric signal, to obtain a raised cosine biased optical signal and then transmitting the raised cosine biased optical signal by optical fibers; or, performing electro-optical conversion, based on the modified duobinary differential electric signal, to obtain a modified duobinary differential optical signal and then transmitting the modified duobinary differential optical signal by optical fibers;

S4: sequentially performing photoelectric conversion, analog despreading, analog-digital conversion, and clock recovery for the raised cosine biased optical signal or the modified duobinary differential optical signal received by the optical fibers to obtain the external data sequence signal, and uploading the external data sequence signal to a client.

For the time-division-multiple-access, a single chip sequence is used in each time slot of the down-link transmission, and interleaving chip sequences are used in each time slot of the up-link transmission, a content of the down-link transmission includes broadcast data, multicast data, and ranging requests, and a content of the up-link transmission includes data and ranging responses.

With the above technical solutions, the invention has the following advantages and positive effects as compared with the prior art:

1) through direct-sequence-spread-spectrum down-link transmission, the target node may synchronize the clock and the phase with the source node, and the dynamic ranging may be supported;

2) through the use of time-division-multiple-access, the time slot of the down-link transmission uses a single chip sequence, and the time slot of the up-link transmission uses interleaving chip sequences, so that the guard interval for the up-link transmission is canceled, the scheduling collisions are reduced, and the bidirectional byte-interleaved transmission is realized while supporting parallel transmission of ranging responses and data;

3) the despreading using an analog domain based approach at a receiving end not only removes impairments introduced by the transmission but improves the sensitivity; through the bidirectional byte-interleaved transmission, the target node and the source node may transmit data bidirectionally with high real-time performance; meanwhile, the simplicity of the interface of the target node may be guaranteed, i.e., the digital processing does not require line-rate equipment, thereby reducing the complexity of the access system.

BRIEF DESCRIPTION OF THE DRAWINGS

With the detailed description of the preferred embodiments below, various advantages and benefits should be clear for a person having ordinary skill in the art. The drawings are only for the purpose of illustrating the preferred embodiments and should not be considered as a limitation to the invention.

EXPLANATION OF NOTATION USED IN DRAWINGS

1: Signal modulation sub-module; 2: Electro-optical conversion sub-module; 31: The first optical filter; 32: The second optical filter; 4: Optical amplifier; 5: Photo-detector; 6: Digital signal processing sub-module; 7: Coupler.

DESCRIPTION OF THE PREFERRED EMBODIMENTS

In order to more clearly describe the embodiments of the invention or the technical solutions in the prior art, the specific embodiments of the invention are described below with reference to the accompanying drawings. Obviously, the drawings below are only some examples of the invention, and those skilled in the art may obtain other drawings and other embodiments on the basis of these drawings without making creative efforts.

In order to keep the drawings concise, the drawings only schematically show the parts related to the invention, and they do not represent its actual structure as a product. In addition, in order to make the drawings concise and easy to understand, in some drawings, only one of the components having the same structure or function is schematically shown, or only one of them is marked. As used herein, "one" not only means"only one", but also"more than one".

The optical transmission device based on direct-sequence-spread-spectrum time-division-multiple-access and the method thereof proposed by the invention will be further described in detail below with reference to the accompanying drawings and specific embodiments. The advantages and features of the invention are apparent from the following description and claims.

Embodiment 1

Figure 1:
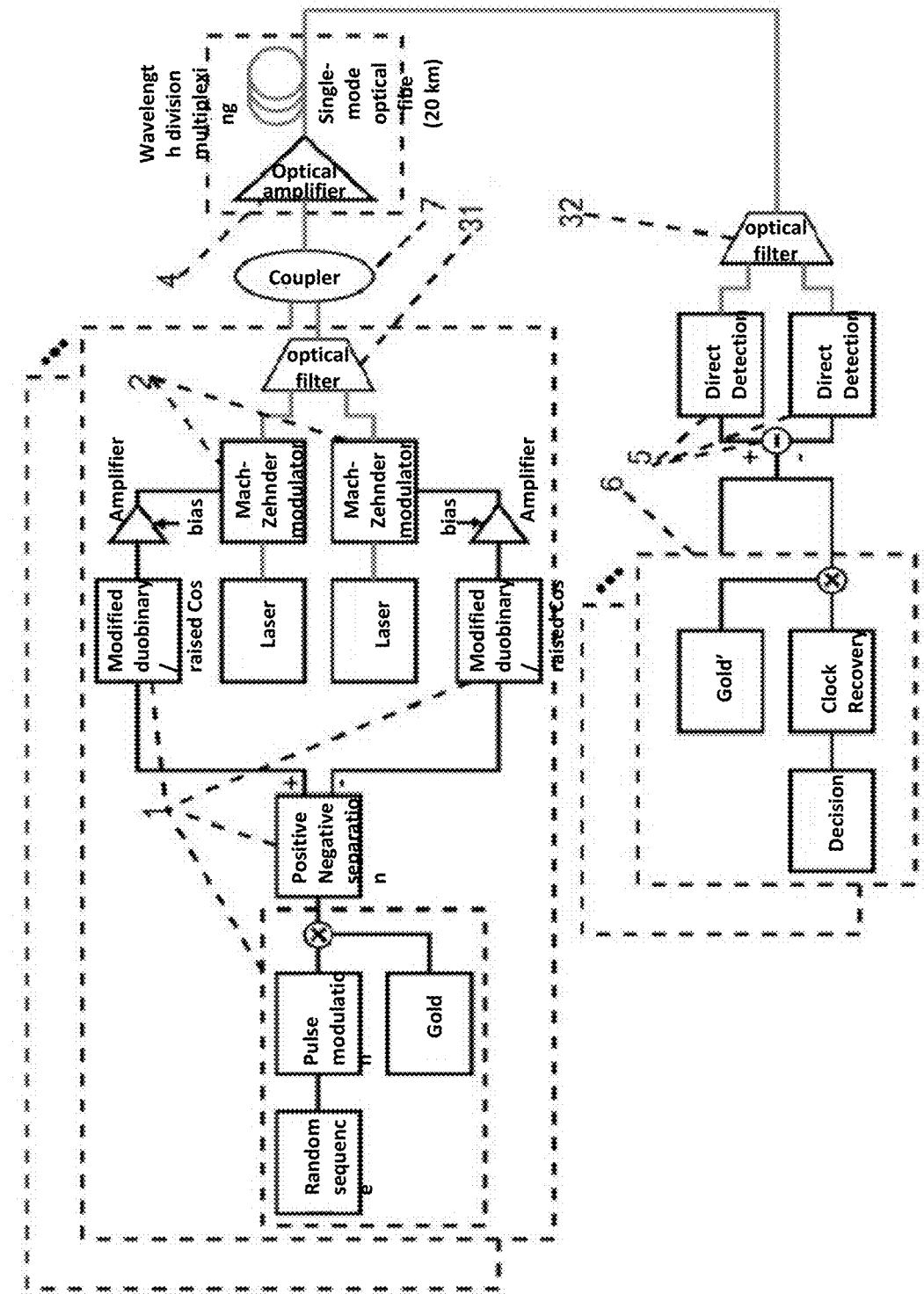
FIG. 1 is a structural diagram of an optical transmission method based on direct-sequence-spread-spectrum time-division-multiple-access according to an embodiment of the invention.

With reference to FIG. 1, the embodiment provides an optical transmission device based on direct-sequence-spread-spectrum time-division-multiple-access, which includes a signal transmitting module and a signal receiving module. The signal transmitting module is connected with the signal receiving module by optical fibers. The signal transmitting module is used for receiving an external data sequence signal, encoding the external data sequence signal into a direct-sequence-spread-spectrum time-division-multiple-access electric signal, and modulating the direct-sequence-spread-spectrum time-division-multiple-access electric signal into a direct-sequence-spread-spectrum time-division-multiple-access optical signal, and then outputting the direct-sequence-spread-spectrum time-division-multiple-access optical signal. The signal receiving module is used for receiving the direct-sequence-spread-spectrum time-division-multiple-access optical signal, and sequentially performing photoelectric conversion, analog despreading, analog-digital conversion, and clock recovery to obtain the external data sequence signal.

With reference to FIG. 1, the signal transmitting module of the embodiment is described in detail. Specifically, the signal transmitting module includes a signal modulation sub-module 1, an electro-optical sub-module 2, a first optical filter 31, a coupler 7, and an optical amplifier 4, wherein the signal modulation sub-module 1 may be replaced. In the embodiment, a raised cosine encoding modulation sub-module and a modified duobinary encoding modulation sub-module are described. The above two signal modulation sub-modules 1 are in an alternative relationship to each other, and the whole system uses non-return-to-zero codes.

The electro-optical conversion sub-module 2 is used for receiving the direct-sequence-spread-spectrum time-division-multiple-access electric signal output by the signal modulation sub-module 1, and modulating an amplitude and a phase of a direct-sequence-spread-spectrum time-division-multiple-access optical signal and outputting a direct-sequence-spread-spectrum time-division-multiple-access optical signal.

The first optical filter 31 is used for sequentially receiving, filtering, and outputting the direct-sequence-spread-spectrum time-division-multiple-access optical signal. The first filter shapes with grating a raised cosine biased optical signal or a modified duobinary differential optical signal. In addition, a receiving end is provided with a second optical filter 32, which is used together with the first filter 31 for an analog multiplexer/demultiplexer.

The coupler 7 is used for receiving the direct-sequence-spread-spectrum time-division-multiple-access optical signal after the filtering to realize the multiplexing of a plurality of optical signals. The optical amplifier 4 is used for receiving the direct-sequence-spread-spectrum time-division-multiple-access optical signal after the multiplexing, performing power amplification and outputting for the same.

Figure 2:
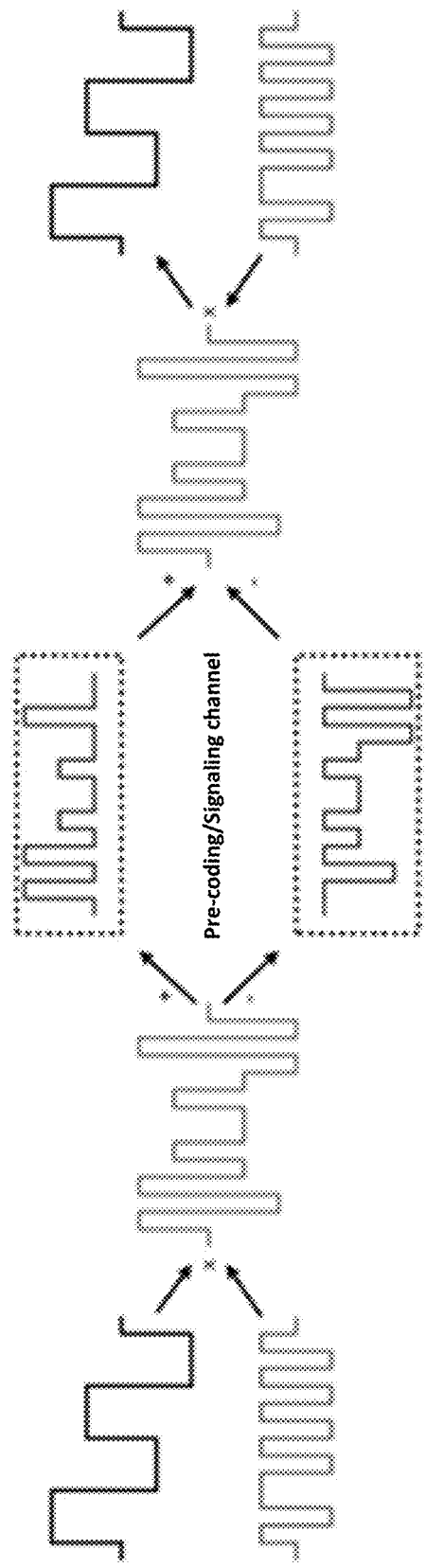
FIG. 2 is a diagram showing the differential transmission of a modified duobinary differential optical signal according to an embodiment of the invention.

Specifically, with reference to FIGS. 1 and 2, when the signal modulation sub-module 1 is a modified duobinary encoding modulation sub-module, the modified duobinary encoding modulation sub-module receives an external data sequence signal, and sequentially performs signal spectrum spreading, positive and negative separation, and modified duobinary encoding to obtain a modified duobinary differential electric signal and output the same. The modified duobinary encoding modulation sub-module includes the spread spectrum encoding unit, the spread spectrum sequence unit, a positive and negative separation unit, a first modified duobinary encoding unit, and a second modified duobinary encoding unit.

An input end of the spread spectrum encoding unit is used for respectively receiving the external data sequence signal and an orthogonal pseudo-random sequence signal (such as Gold sequence) of the spread spectrum sequence unit, which is to realize spread spectrum encoding of the external data sequence signal to obtain a spread spectrum signal.

An output end of the spread spectrum encoding unit is connected with an input end of the positive and negative separation unit, and the positive and negative separation unit receives the spread spectrum signal and separates the same to obtain direct-sequence-spread-spectrum time-division-multiple-access differential signals.

Output ends of the positive and negative separation unit are connected with an input end of the first modified duobinary encoding unit and an input end of the second modified duobinary encoding unit, respectively. Respectively, the modified duobinary encoding units receive and perform modified duobinary encoding on one of the direct-sequence-spread-spectrum time-division-multiple-access differential signals to obtain the modified duobinary differential electric signals.

Since the modified duobinary encoding modulation sub-module is used, a specific electro-optical conversion sub-module 2 should be used correspondingly, and the above electro-optical conversion sub-module 2 includes a first electric amplifier, a second electric amplifier, a first $V_\pi$ biased Mach-Zehnder modulator, and a second $V_\pi$ biased Mach-Zehnder modulator. The first electric amplifier and the second electric amplifier are connected with the first modified duobinary encoding unit and the second modified duobinary encoding unit respectively for receiving and obtaining one of the modified duobinary differential electric signals and performing electric amplification and outputting the same.

The first $V_\pi$ biased Mach-Zehnder modulator and the second $V_\pi$ biased Mach-Zehnder modulator are connected with the first electric amplifier and the second electric amplifier, respectively. The $V_\pi$ biased Mach-Zehnder modulators are used for: receiving the modified duobinary differential electric signals after the electric amplification; converting the electric signal into the optical signal and controlling an amplitude and a phase thereof through an external modulation laser to obtain modified duobinary differential optical signals; and outputting the modified duobinary differential optical signals. Since the $V_\pi$ biased Mach-Zehnder modulator has zero bias capability, the optical signal may be modulated with positive and negative phases to reduce the amplitude of the modulated and output optical signal.

Figure 3:
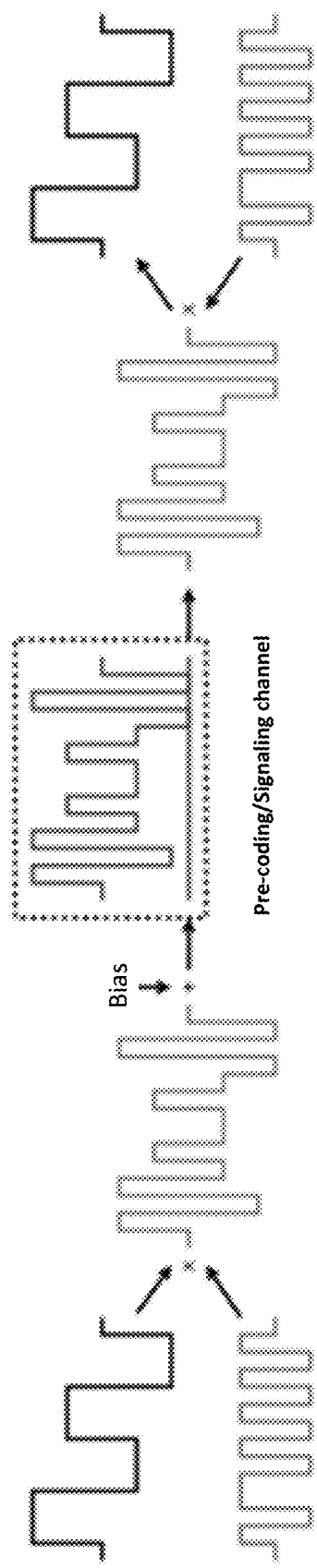
FIG. 3 is a diagram showing the transmission of a raised cosine biased optical signal according to an embodiment of the invention.

With reference to FIGS. 1 and 3, when the signal modulation sub-module 1 is a raised cosine encoding modulation sub-module, the raised cosine encoding modulation sub-module is used for receiving the external data sequence signal, and sequentially performing signal spectrum spreading and raised cosine encoding to obtain the raised cosine electric signal and outputting the same, wherein the raised cosine encoding modulation sub-module includes the spread spectrum encoding unit, the spread spectrum sequence unit and a raised cosine encoding unit.

Similar to the modified duobinary encoding modulation sub-module, the spread spectrum encoding unit of the raised cosine encoding modulation sub-module is used for receiving the external data sequence signal and the orthogonal pseudo-random sequence signal (such as Gold sequence) of the spread spectrum sequence unit to realize spread spectrum encoding of the external data sequence signal to obtain the spread spectrum signal.

An input end of the raised cosine encoding unit is connected with an output end of the spread spectrum encoding unit for receiving the spread spectrum signal to perform raised cosine encoding to obtain the raised cosine electric signal.

Since the raised cosine encoding modulation sub-module is used, the electro-optical conversion sub-module 2 is adjusted correspondingly. Therefore, the electro-optical conversion sub-module 2 here includes an electric amplifier and a $V_{\pi/2}$ biased Mach-Zehnder modulator One end of the electric amplifier is connected with an output end of the raised cosine encoding unit for receiving the raised cosine electric signal, performing signal amplification, and then outputting the same. The $V_{\pi/2}$ biased Mach-Zehnder modulator is connected with the other end of the electric amplifier for receiving the raised cosine electric signal after electric amplification; then, the amplitude and the phase thereof are modulated jointly through the external modulation laser to obtain a raised cosine biased optical signal. Since the $V_{\pi/2}$ biased Mach-Zehnder modulator has orthogonal bias capability, an optical signal with a positive amplitude may be output.

In summary, the signal transmitting module of the embodiment has been described. The signal transmitting module transmits optical signals through the interconnection of single-mode optical fibers and an optical filter with a bandwidth of 12.5 GHz. The signal receiving module performs signal receiving, and the optical filters are the first optical filter 31 and the second optical filter 32.

With reference to FIG. 1, the signal receiving module is described in detail.

The signal receiving module includes a second optical filter 32, a photo detector 5, an analog-to-digital converter, and a digital signal processing sub-module 6. The second optical filter 32 is used together with the first optical filter 31 for an analog multiplexer/demultiplexer.

The photo detector 5 is used for receiving the direct-sequence-spread-spectrum time-division-multiple-access optical signal output by the second optical filter 32, and converting it into the electric signal and outputting the same. The photo detector 5 may be a photodiode or an avalanche diode APD. After detection, if the signal is transmitted differentially, the signal needs to be subtracted to obtain the signal before the positive and negative separation.

The analog-to-digital converter is connected with the photo detector 5 for receiving the electric signals thereof, converting the electric signals into digital signals, and outputting the digital signals.

The digital signal processing sub-module 6 is used for performing clock recovery for the received digital signals to obtain the external data sequence signal and is used for uploading the external data sequence signal to a client. The digital signal processing sub-module may further use the resulting clock to control the sampling points for analog-to-digital conversion in the process of analog-to-digital conversion of an analog electrical signal output by the photo detector.

Preferably, the device further includes a local sequence unit, wherein the local sequence unit is used for providing the orthogonal pseudo-random sequence signal, converting the electric signals output by the photo detector 5 into despread electric signals, and delivering the despread electric signals to the analog-to-digital converter.

The actual changes of the signal and performance test of the embodiment are described in detail.

With reference to FIG. 2, after the modified duobinary encoding modulation sub-module is applied, the spread spectrum signal may be obtained by spectrum spreading the original signal through the spread spectrum sequence, and then is subjected to positive and negative separation and differential transmission after channel coding to be finally detected at the receiving end; the original signal is recovered after despreading by using subtraction for recovering the spread spectrum signal.

With reference to FIG. 3, after the raised cosine encoding modulation sub-module is applied, the spread spectrum signal may perform spectrum spreading on the original signal through the spread spectrum sequence, which then is subjected to optical bias and transmission after channel coding to obtain the spread spectrum signal at the receiving end finally; the original signal is recovered after despreading.

Figure 4:
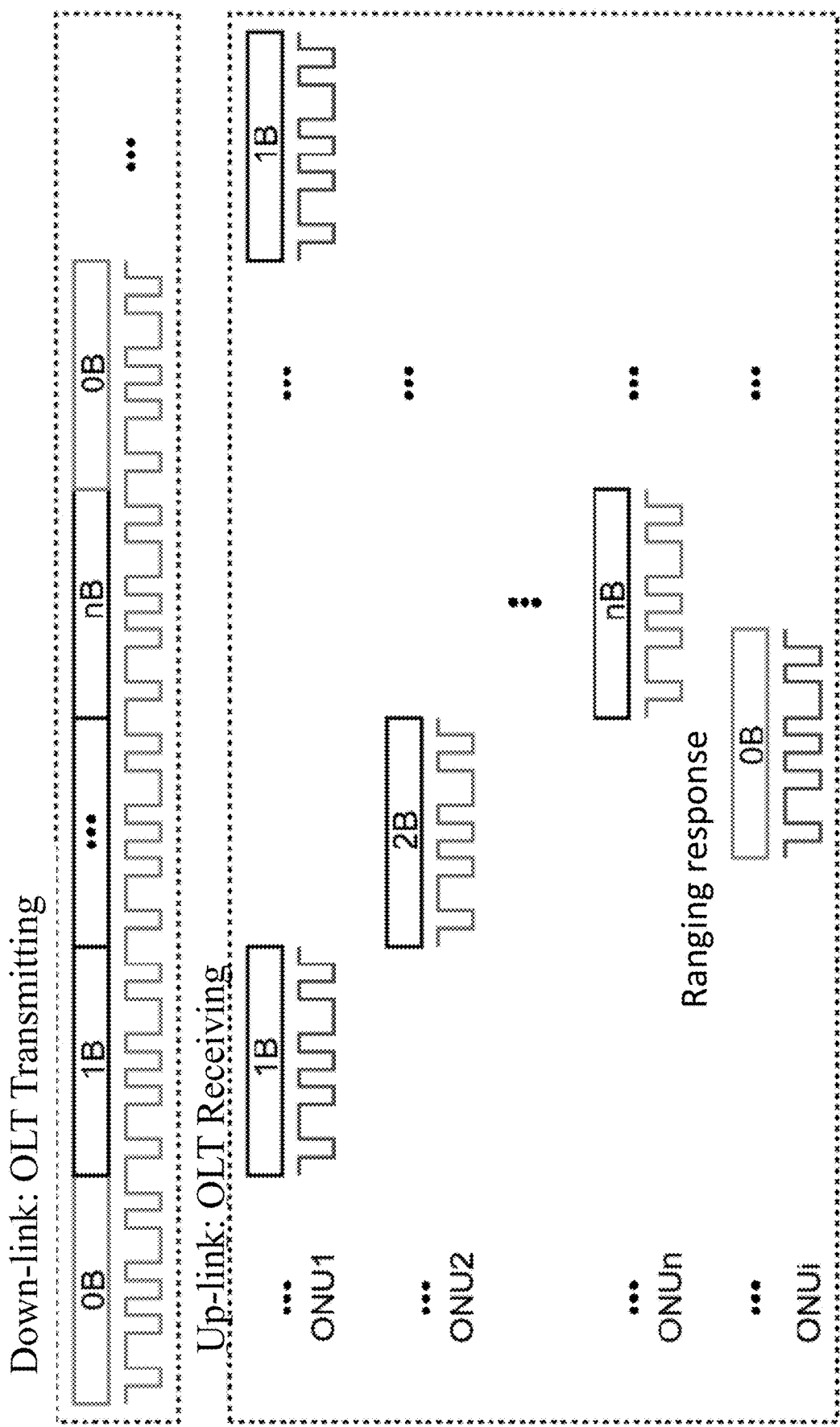
FIG. 4 is a timing diagram of up-link and down-link transmission of the time-division-multiple-access optical signal according to an embodiment of the invention.

With reference to FIG. 4, in the embodiment, the byte-interleaved multiple-access protocol uses separate up-link and down-link protocol in the transmission process, wherein a single chip sequence is used in different slots of the down-link transmission to transmit multicast data, broadcast data, and ranging requests; the byte-interleaved multiple-access is used in different slots of the up-link transmission to transmit data and ranging responses, so that the guard interval for the up-link transmission is removed to realize bidirectional byte-interleaved transmission. The down-link transmission uses one slot for each target, and has a common broadcast slot, thereby supporting clock transmission, phase synchronization and ranging requests, but the single chip sequence is used for all time slots. The up-link transmission uses one slot for each target, and may return ranging responses concurrently. The ranging responses use broadcast time slots, but each time slot uses a different chip sequence. Due to the chip sequence interleaving of the up-link time slot, there are at most 3 overlapping data chip sequences plus the ranging response in the same time slot. Therefore, only the inter-chip crosstalk among 3 chip sequences needs to be suppressed, and short chip sequences may be used. Finally, the byte-interleaved multiple-access protocol ensures high link utilization through the use of short chip sequences.

Figure 5:
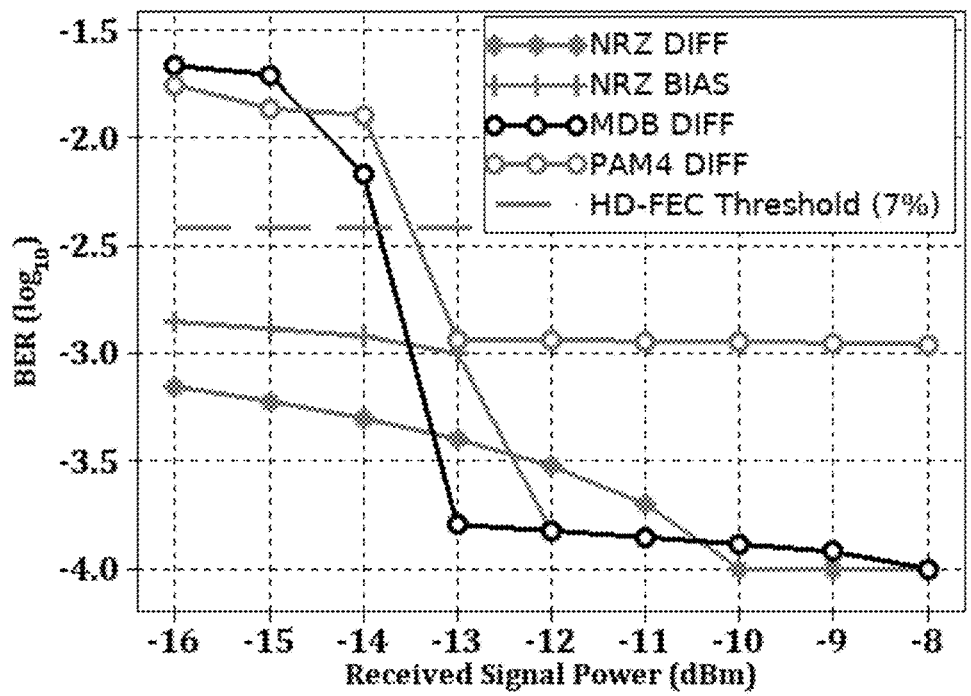
FIG. 5 is a diagram showing test effects in performance comparison of the down-link transmission of the time-division-multiple-access optical signal according to an embodiment of the invention.

With reference to FIG. 5, the test results for the performance of the down-link transmission of the direct-sequence-spread-spectrum time-division-multiple-access optical signal show that the performance of the modified duobinary differential transmission is similar to that of the raised cosine differential transmission, as well as that of the raised cosine biased transmission.

Figure 6:
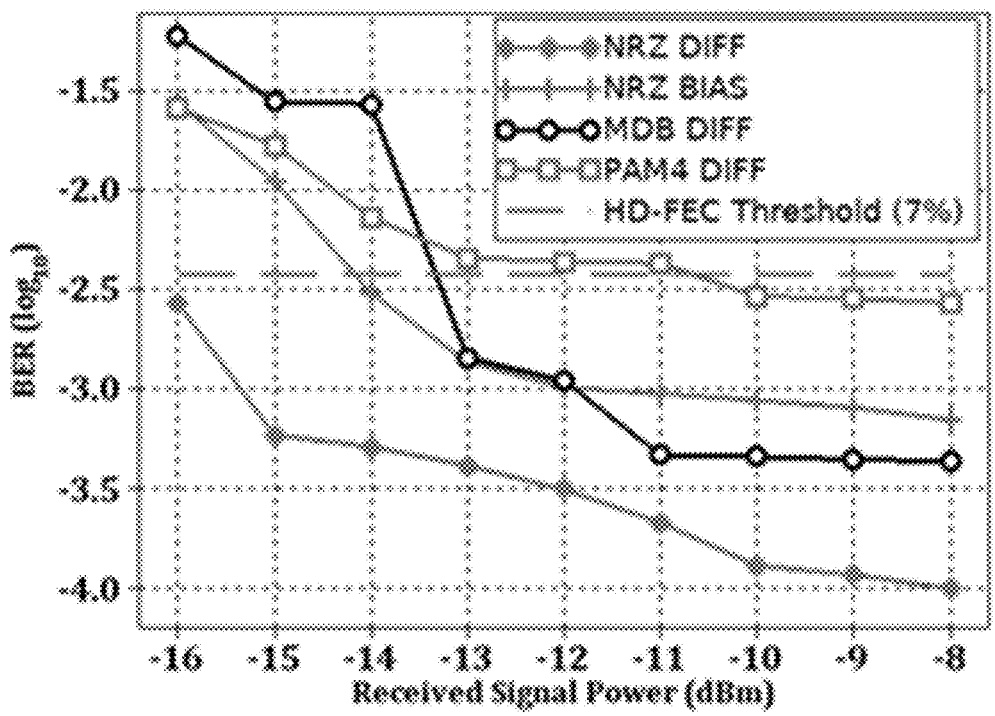
FIG. 6 is a diagram showing test effects in performance comparison of the up-link transmission of the time-division-multiple-access optical signal according to an embodiment of the invention.

With reference to FIG. 6, the test results for the performance of the up-link transmission of the direct-sequence-spread-spectrum time-division-multiple-access optical signal show that the performance of the modified duobinary differential transmission is similar to that of the raised cosine differential transmission, as well as that of the raised cosine biased transmission.

Embodiment 2

Figure 7:
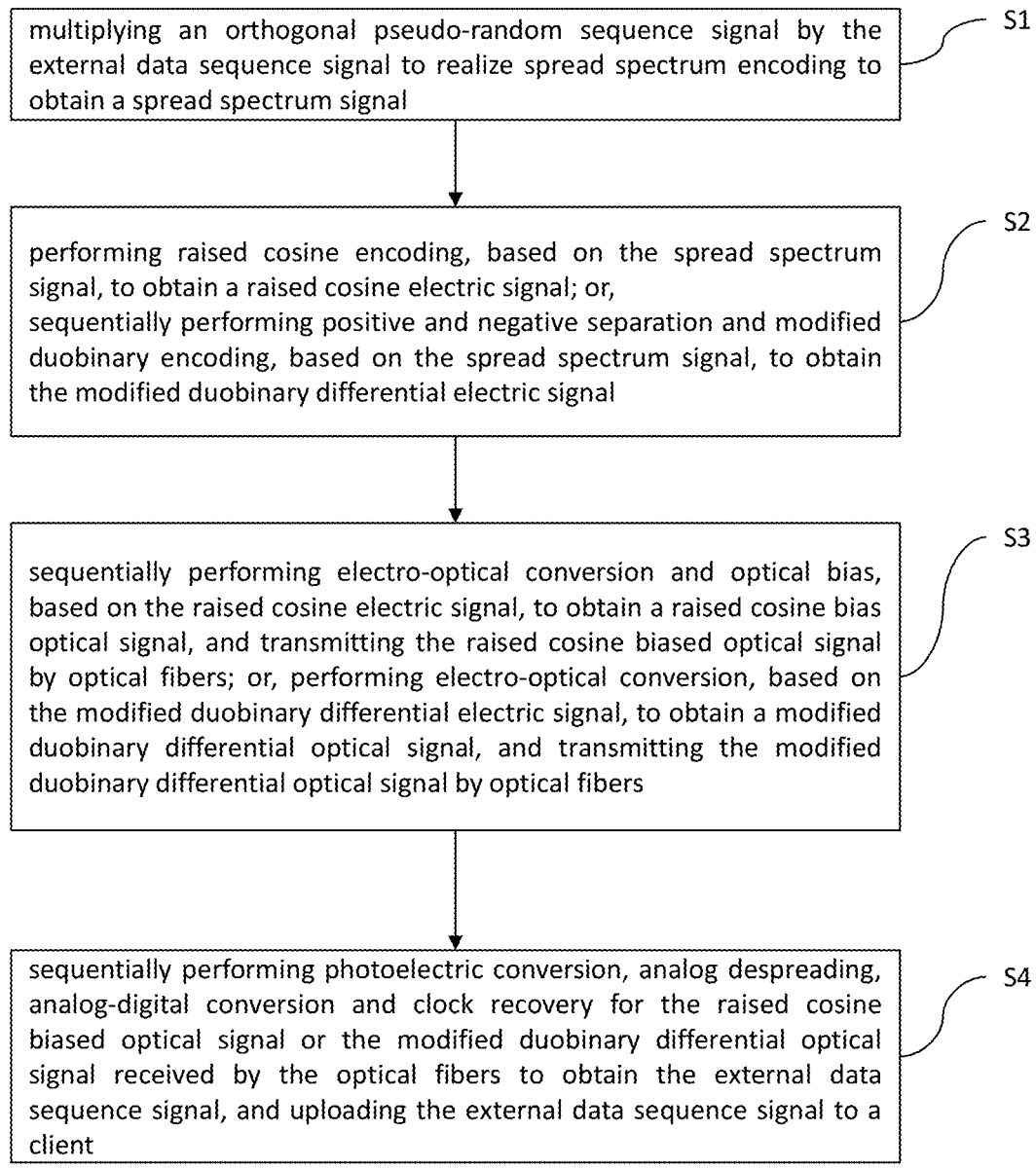
FIG. 7 is a flow chart of an optical transmission method based on direct-sequence-spread-spectrum time-division-multiple-access according to an embodiment of the invention.

With reference to FIG. 7, the embodiment provides an optical transmission method based on direct-sequence-spread-spectrum time-division-multiple-access on the basis of Embodiment 1. The method applies the optical transmission device based on direct-sequence-spread-spectrum time-division-multiple-access according to any item of Embodiment 1, and includes the following steps:

S1: an orthogonal pseudo-random sequence signal is multiplied by the external data sequence signal to realize spread spectrum encoding to obtain a spread spectrum signal;

S2: either raised cosine encoding is performed, based on the spread spectrum signal, to obtain a raised cosine electric signal; or, positive and negative separation and modified duobinary encoding are sequentially performed, based on the spread spectrum signal, to obtain the modified duobinary differential electric signal;

S3: either electro-optical conversion and optical bias are performed, based on the raised cosine electric signal, to obtain a raised cosine biased optical signal and then transmit the raised cosine biased optical signal by optical fibers; or, electro-optical conversion is performed, based on the modified duobinary differential electric signal, to obtain a modified duobinary differential optical signal and then transmit the modified duobinary differential optical signal by optical fibers;

S4: photoelectric conversion, analog despreading, analog-digital conversion, and clock recovery are sequentially performed for the raised cosine biased optical signal or the modified duobinary differential optical signal received by the optical fibers to obtain the external data sequence signal, and the external data sequence signal is uploaded to a client.

The embodiment is described as the followings: through the establishment of the optical transmission method based on direct-sequence-spread-spectrum time-division-multiple-access (the signal transmitting module, the optical fiber, and the signal receiving module, in summary), high real-time optical transmission of high-speed signal may be realized. The signal transmitting module is connected to the signal receiving module by the optical fiber, wherein the modulation mode adopted by the signal transmitting module for the external data sequence to be transmitted is direct-sequence-spread-spectrum time-division-multiple-access modulation. The signal transmitting module pre-codes the external data sequence (random sequence) to be transmitted into the direct-sequence-spread-spectrum time-division-multiple-access electrical signal, which is transmitted into an internal optical modulator, and then into an internal optical filter to be shaped with the grating. Subsequently, the shaped optical signal is amplified and transmitted through a 20-kilometer single-mode fiber, and the received laser signal passes through the optical filter to finally form an optical signal to be detected. Specifically, the optical filter may exist at both the transmitting end and the receiving end and is used for the analog multiplexer/demultiplexer.

At the signal receiving module, the optical signal with improved real-time performance based on the direct-sequence-spread-spectrum time-division-multiple-access is directly detected. Then, the optical signal is subjected to clock recovery and despreading to remove distortion caused by direct detection and transmission nonlinearity, then is processed by the next stage, such as FEC decoding. In practical applications, the above process may be implemented by any device such as arbitrary waveform generators, lasers, electrical amplifiers, Mach-Zehnder modulators, erbium-doped optical fiber amplifiers, optical fibers, tunable optical filters, direct detection photo-detectors, and sampling storage oscilloscopes.

In summary, the embodiment provides an optical transmission method based on direct-sequence-spread-spectrum time-division-multiple-access, which supports direct detection of optical signals, i.e., square-law demodulation. In the embodiment, the direct-sequence-spread-spectrum modulation method is used, the modulation method works by biasing the Mach-Zehnder optical modulator at the orthogonal point, i.e., $V_{\pi/2}$, or the zero point, i.e., $V_\pi$, to achieve raised cosine biased transmission encoding and modified duobinary differential transmission encoding in combination of pre-coding; at the signal receiving module, the received signal is despread to remove inter-chip crosstalk and non-linear distortion, and reduce the complexity of digital processing. The embodiment improves the sensitivity of direct detection to the range that may be achieved by photoelectric detection, while maintaining the real-time performance of the transmitting and receiving equipment, which is suitable for high real-time passive optical access. Further, the byte-interleaved transmission may reduce the complexity of signal processing and improve the integrity of optical interfaces.

The implementations of the invention are described in detail above with reference to the accompanying drawings, but the invention is not limited to the above implementations. Even if various changes are made to the invention, if these changes fall within the scope of the claims of the invention and the technical equivalents thereof, they still fall within the protection scope of the invention.

The invention claimed is:

1. An optical transmission device based on direct-sequence-spread-spectrum time-division-multiple-access, comprising a signal transmitting module and a signal receiving module;
   wherein the signal transmitting module is connected with the signal receiving module by optical fibers;
   the signal transmitting module is used for receiving an external data sequence signal, encoding the external data sequence signal into a direct-sequence-spread-spectrum time-division-multiple-access electric signal, and modulating the direct-sequence-spread-spectrum time-division-multiple-access electric signal into a direct-sequence-spread-spectrum time-division-multiple-access optical signal;
   the signal receiving module is used for receiving the direct-sequence-spread-spectrum time-division-multiple-access optical signal and sequentially performing photoelectric conversion, analog despreading, analog-digital conversion, and clock recovery to obtain the external data sequence signal;
   the signal transmitting module comprises a signal modulation sub-module, and the signal modulation sub-module is a raised cosine encoding modulation sub-module or a modified duobinary encoding modulation sub-module, wherein the raised cosine encoding modulation sub-module is used for receiving the external data sequence signal and sequentially performing signal spectrum spreading and raised cosine encoding to obtain a raised cosine electric signal;
   the modified duobinary encoding modulation sub-module is used for receiving the external data sequence signal and sequentially performing signal spectrum spreading, positive and negative separation, and modified duobinary encoding to obtain a modified duobinary differential electric signal.

2. The optical transmission device based on direct-sequence-spread-spectrum time-division-multiple-access according to claim 1, wherein the signal transmitting module further comprises an electro-optical conversion sub-module, a first optical filter, and an optical amplifier;
   the electro-optical conversion sub-module is used for modulating the direct-sequence-spread-spectrum time-division-multiple-access electric signal into the direct-sequence-spread-spectrum time-division-multiple-access optical signal;
   the first optical filter is used for filtering the direct-sequence-spread-spectrum time-division-multiple-access optical signal;
   the optical amplifier is used for power amplification of the direct-sequence-spread-spectrum time-division-multiple-access optical signal after the filtering.

3. The optical transmission device based on direct-sequence-spread-spectrum time-division-multiple-access according to claim 1, wherein the raised cosine encoding modulation sub-module comprises a spread spectrum encoding unit, a spread spectrum sequence unit, and a raised cosine encoding unit;
   the spread spectrum encoding unit is used for receiving the external data sequence signal and an orthogonal pseudo-random sequence signal of the spread spectrum sequence unit to realize spread spectrum encoding of the external data sequence signal to obtain a spread spectrum signal;
   the raised cosine encoding unit is used for receiving the spread spectrum signal to perform raised cosine encoding to obtain the raised cosine electric signal.

4. The optical transmission device based on direct-sequence-spread-spectrum time-division-multiple-access according to claim 1, wherein the modified duobinary encoding modulation sub-module comprises the spread spectrum encoding unit, the spread spectrum sequence unit, a positive and negative separation unit, a first modified duobinary encoding unit, and a second modified duobinary encoding unit;
   the spread spectrum encoding unit is used for receiving the external data sequence signal and an orthogonal pseudo-random sequence signal of the spread spectrum sequence unit to realize spread spectrum encoding of the external data sequence signal to obtain a spread spectrum signal;
   the positive and negative separation unit is used for receiving the spread spectrum signal and separating to obtain direct-sequence-spread-spectrum time-division-multiple-access differential signals;
   the first modified duobinary encoding unit and the second modified duobinary encoding unit are used for respectively performing modified duobinary encoding on one of the direct-sequence-spread-spectrum time-division-multiple-access differential signals to obtain the modified duobinary differential electric signals.

5. The optical transmission device based on direct-sequence-spread-spectrum time-division-multiple-access according to claim 3, wherein the electro-optical conversion sub-module comprises an electric amplifier and a $V_{\pi/2}$ biased Mach-Zehnder modulator;
the electric amplifier is used for receiving the raised cosine electric signal and performing electric signal amplification;
the $V_{\pi/2}$ biased Mach-Zehnder modulator is used for receiving the raised cosine electric signal after the electric amplification and modulating to obtain a raised cosine biased optical signal.

6. The optical transmission device based on direct-sequence-spread-spectrum time-division-multiple-access according to claim 4, wherein the electro-optical conversion sub-module comprises a first electric amplifier, a second electric amplifier, a first $V_\pi$ biased Mach-Zehnder modulator, and a second $V_\pi$ biased Mach-Zehnder modulator;
the first electric amplifier and the second electric amplifier are used for respectively receiving one of the modified duobinary differential electric signals and performing biased amplification;
the first $V_\pi$ biased Mach-Zehnder modulator and the second $V_\pi$ biased Mach-Zehnder modulator are used for converting the modified duobinary differential electric signals output by the first electric amplifier and the second electric amplifier after the electric amplification into optical signals to obtain modified duobinary differential optical signals.

7. The optical transmission device based on direct-sequence-spread-spectrum time-division-multiple-access according to claim 6, wherein the signal receiving module comprises a second optical filter, a photo detector, an analog-to-digital converter, and a digital signal processing sub-module;
both the second optical filter and the first optical filter are used for an analog multiplexer/demultiplexer to realize final optical filtering;
the photo detector is used for receiving the direct-sequence-spread-spectrum time-division-multiple-access optical signal after the filtering and converting it into electric signals, then also, performing a subtraction operation required for the differential electrical signals;
the analog-to-digital converter is used for receiving the electric signals and converting the electric signals into digital signals;
the digital signal processing sub-module is used for performing clock recovery for the received digital signals to obtain the external data sequence signal, and uploading the external data sequence signal to a client.

8. The optical transmission device based on direct-sequence-spread-spectrum time-division-multiple-access according to claim 7, further comprising a local sequence unit, wherein the local sequence unit is used for providing the orthogonal pseudo-random sequence signal, converting the electric signals output by the photo detector into despread electric signals and delivering the despread electric signals to the analog-to-digital converter.

9. An optical transmission method based on direct-sequence-spread-spectrum time-division-multiple-access, applied to the optical transmission device based on direct-sequence-spread-spectrum time-division-multiple-access according to claim 8, comprising steps of:

S1: multiplying an orthogonal pseudo-random sequence signal by the external data sequence signal to realize spread spectrum encoding to obtain a spread spectrum signal;
S2: either performing raised cosine encoding based on the spread spectrum signal to obtain a raised cosine electric signal; or,
sequentially performing positive and negative separation and modified duobinary encoding based on the spread spectrum signal to obtain the modified duobinary differential electric signal;
S3: either sequentially performing electro-optical conversion and optical bias, based on the raised cosine electric signal, to obtain a raised cosine biased optical signal and then transmitting the raised cosine biased optical signal by optical fibers; or,
performing electro-optical conversion, based on the modified duobinary differential electric signal, to obtain a modified duobinary differential optical signal and then transmitting the modified duobinary differential optical signal by optical fibers;
S4: sequentially performing photoelectric conversion, analog despreading, analog-digital conversion, and clock recovery for the raised cosine biased optical signal or the modified duobinary differential optical signal received by the optical fibers to obtain the external data sequence signal, and uploading the external data sequence signal to a client.

10. The optical transmission method based on direct-sequence-spread-spectrum time-division-multiple-access according to claim 9, wherein for the time-division-multiple-access, a single chip sequence is used in each time slot of down-link transmission, and a separate chip sequence is used in each time slot of up-link transmission; a content of the down-link transmission comprises broadcast data, multicast data, and ranging requests.

11. The optical transmission device based on direct-sequence-spread-spectrum time-division-multiple-access according to claim 3, wherein the signal receiving module comprises a second optical filter, a photo detector, an analog-to-digital converter, and a digital signal processing sub-module;
both the second optical filter and the first optical filter are used for an analog multiplexer/demultiplexer to realize final optical filtering;
the photo detector is used for receiving the direct-sequence-spread-spectrum time-division-multiple-access optical signal after the filtering and converting it into electric signals, then also, performing a subtraction operation required for the differential electrical signals;
the analog-to-digital converter is used for receiving the electric signals and converting the electric signals into digital signals;
the digital signal processing sub-module is used for performing clock recovery for the received digital signals to obtain the external data sequence signal, and uploading the external data sequence signal to a client.

12. The optical transmission device based on direct-sequence-spread-spectrum time-division-multiple-access according to claim 1, wherein the signal receiving module comprises a second optical filter, a photo detector, an analog-to-digital converter, and a digital signal processing sub-module;
both the second optical filter and the first optical filter are used for an analog multiplexer/demultiplexer to realize final optical filtering;

the photo detector is used for receiving the direct-sequence-spread-spectrum time-division-multiple-access optical signal after the filtering and converting it into electric signals, then also, performing a subtraction operation required for the differential electrical signals;

the analog-to-digital converter is used for receiving the electric signals and converting the electric signals into digital signals;

the digital signal processing sub-module is used for performing clock recovery for the received digital signals to obtain the external data sequence signal, and uploading the external data sequence signal to a client.

13. An optical transmission method based on direct-sequence-spread-spectrum time-division-multiple-access, applied to the optical transmission device based on direct-sequence-spread-spectrum time-division-multiple-access according to claim 6, comprising steps of:

S1: multiplying an orthogonal pseudo-random sequence signal by the external data sequence signal to realize spread spectrum encoding to obtain a spread spectrum signal;

S2: either performing raised cosine encoding based on the spread spectrum signal to obtain a raised cosine electric signal; or, sequentially performing positive and negative separation and modified duobinary encoding based on the spread spectrum signal to obtain the modified duobinary differential electric signal;

S3: either sequentially performing electro-optical conversion and optical bias, based on the raised cosine electric signal, to obtain a raised cosine biased optical signal and then transmitting the raised cosine biased optical signal by optical fibers; or, performing electro-optical conversion, based on the modified duobinary differential electric signal, to obtain a modified duobinary differential optical signal and then transmitting the modified duobinary differential optical signal by optical fibers;

S4: sequentially performing photoelectric conversion, analog despreading, analog-digital conversion, and clock recovery for the raised cosine biased optical signal or the modified duobinary differential optical signal received by the optical fibers to obtain the external data sequence signal, and uploading the external data sequence signal to a client.

14. The optical transmission method based on direct-sequence-spread-spectrum time-division-multiple-access according to claim 13, wherein for the time-division-multiple-access, a single chip sequence is used in each time slot of down-link transmission, and a separate chip sequence is used in each time slot of up-link transmission; a content of the down-link transmission comprises broadcast data, multicast data, and ranging requests.

15. An optical transmission method based on direct-sequence-spread-spectrum time-division-multiple-access, applied to the optical transmission device based on direct-sequence-spread-spectrum time-division-multiple-access according to claim 4, comprising steps of:

S1: multiplying an orthogonal pseudo-random sequence signal by the external data sequence signal to realize spread spectrum encoding to obtain a spread spectrum signal;

S2: either performing raised cosine encoding based on the spread spectrum signal to obtain a raised cosine electric signal; or, sequentially performing positive and negative separation and modified duobinary encoding based on the spread spectrum signal to obtain the modified duobinary differential electric signal;

S3: either sequentially performing electro-optical conversion and optical bias, based on the raised cosine electric signal, to obtain a raised cosine biased optical signal and then transmitting the raised cosine biased optical signal by optical fibers; or, performing electro-optical conversion, based on the modified duobinary differential electric signal, to obtain a modified duobinary differential optical signal and then transmitting the modified duobinary differential optical signal by optical fibers;

S4: sequentially performing photoelectric conversion, analog despreading, analog-digital conversion, and clock recovery for the raised cosine biased optical signal or the modified duobinary differential optical signal received by the optical fibers to obtain the external data sequence signal, and uploading the external data sequence signal to a client.

16. The optical transmission method based on direct-sequence-spread-spectrum time-division-multiple-access according to claim 15, wherein for the time-division-multiple-access, a single chip sequence is used in each time slot of down-link transmission, and a separate chip sequence is used in each time slot of up-link transmission; a content of the down-link transmission comprises broadcast data, multicast data, and ranging requests.

17. An optical transmission method based on direct-sequence-spread-spectrum time-division-multiple-access, applied to the optical transmission device based on direct-sequence-spread-spectrum time-division-multiple-access according to claim 2, comprising steps of:

S1: multiplying an orthogonal pseudo-random sequence signal by the external data sequence signal to realize spread spectrum encoding to obtain a spread spectrum signal;

S2: either performing raised cosine encoding based on the spread spectrum signal to obtain a raised cosine electric signal; or, sequentially performing positive and negative separation and modified duobinary encoding based on the spread spectrum signal to obtain the modified duobinary differential electric signal;

S3: either sequentially performing electro-optical conversion and optical bias, based on the raised cosine electric signal, to obtain a raised cosine biased optical signal and then transmitting the raised cosine biased optical signal by optical fibers; or, performing electro-optical conversion, based on the modified duobinary differential electric signal, to obtain a modified duobinary differential optical signal and then transmitting the modified duobinary differential optical signal by optical fibers;

S4: sequentially performing photoelectric conversion, analog despreading, analog-digital conversion, and clock recovery for the raised cosine biased optical signal or the modified duobinary differential optical signal received by the optical fibers to obtain the external data sequence signal, and uploading the external data sequence signal to a client.

18. The optical transmission method based on direct-sequence-spread-spectrum time-division-multiple-access according to claim 17, wherein for the time-division-multiple-access, a single chip sequence is used in each time slot of down-link transmission, and a separate chip sequence is used in each time slot of up-link transmission; a content of the down-link transmission comprises broadcast data, multicast data, and ranging requests.

19. An optical transmission method based on direct-sequence-spread-spectrum time-division-multiple-access, applied to the optical transmission device based on direct-sequence-spread-spectrum time-division-multiple-access according to claim 1, comprising steps of:
   S1: multiplying an orthogonal pseudo-random sequence signal by the external data sequence signal to realize spread spectrum encoding to obtain a spread spectrum signal;
   S2: either performing raised cosine encoding based on the spread spectrum signal to obtain a raised cosine electric signal; or,
   sequentially performing positive and negative separation and modified duobinary encoding based on the spread spectrum signal to obtain the modified duobinary differential electric signal;
   S3: either sequentially performing electro-optical conversion and optical bias, based on the raised cosine electric signal, to obtain a raised cosine biased optical signal and then transmitting the raised cosine biased optical signal by optical fibers; or,
   performing electro-optical conversion, based on the modified duobinary differential electric signal, to obtain a modified duobinary differential optical signal and then transmitting the modified duobinary differential optical signal by optical fibers;
   S4: sequentially performing photoelectric conversion, analog despreading, analog-digital conversion, and clock recovery for the raised cosine biased optical signal or the modified duobinary differential optical signal received by the optical fibers to obtain the external data sequence signal, and uploading the external data sequence signal to a client.

20. The optical transmission method based on direct-sequence-spread-spectrum time-division-multiple-access according to claim 19, wherein for the time-division-multiple-access, a single chip sequence is used in each time slot of down-link transmission, and a separate chip sequence is used in each time slot of up-link transmission; a content of the down-link transmission comprises broadcast data, multicast data, and ranging requests.

* * * * *